Dec. 29, 1936.   F. TWYMAN ET AL   2,065,953
APPARATUS FOR INVESTIGATING ABSORPTION SPECTRA OF SUBSTANCES
Filed March 10, 1934   3 Sheets-Sheet 1
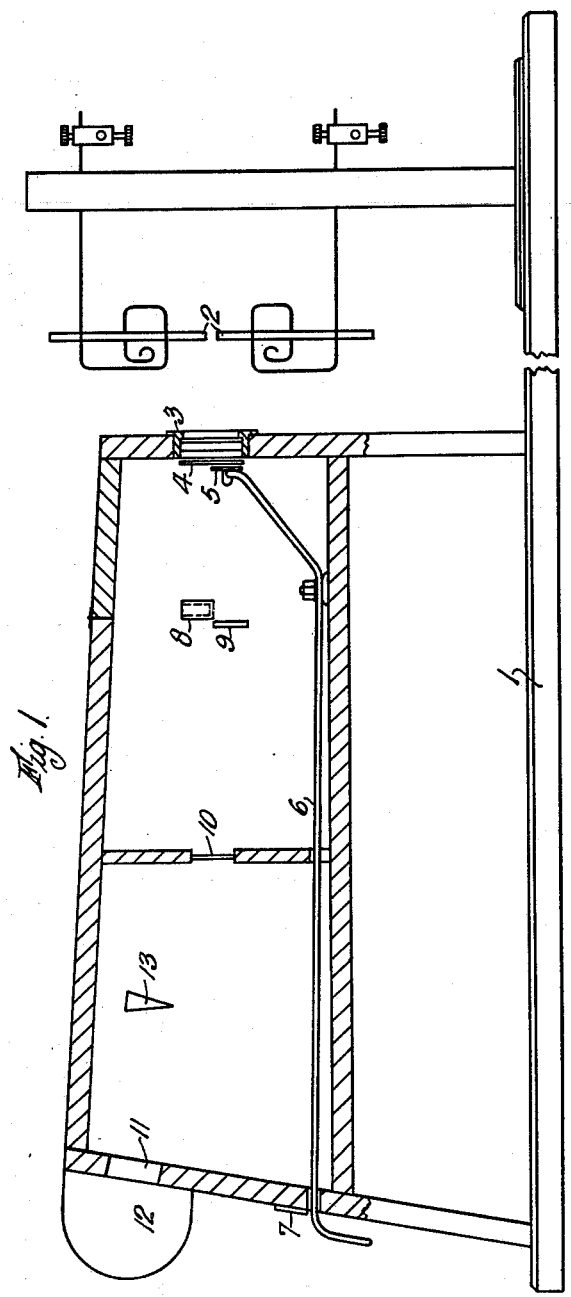

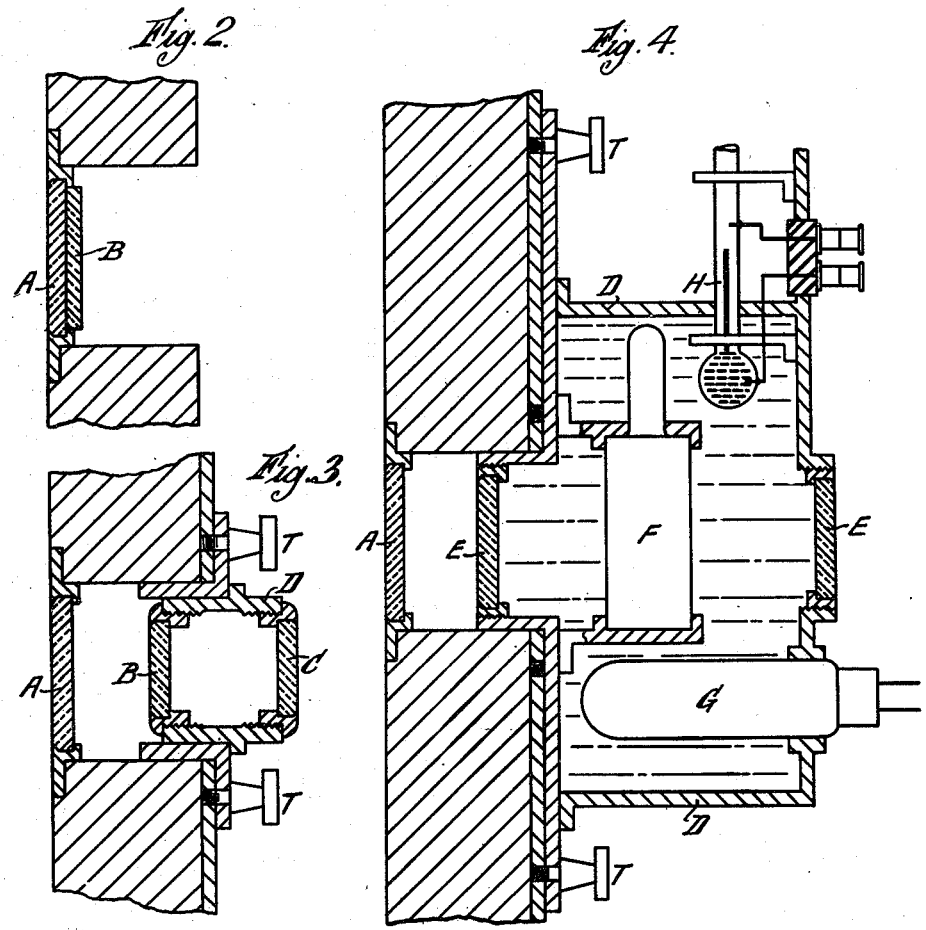

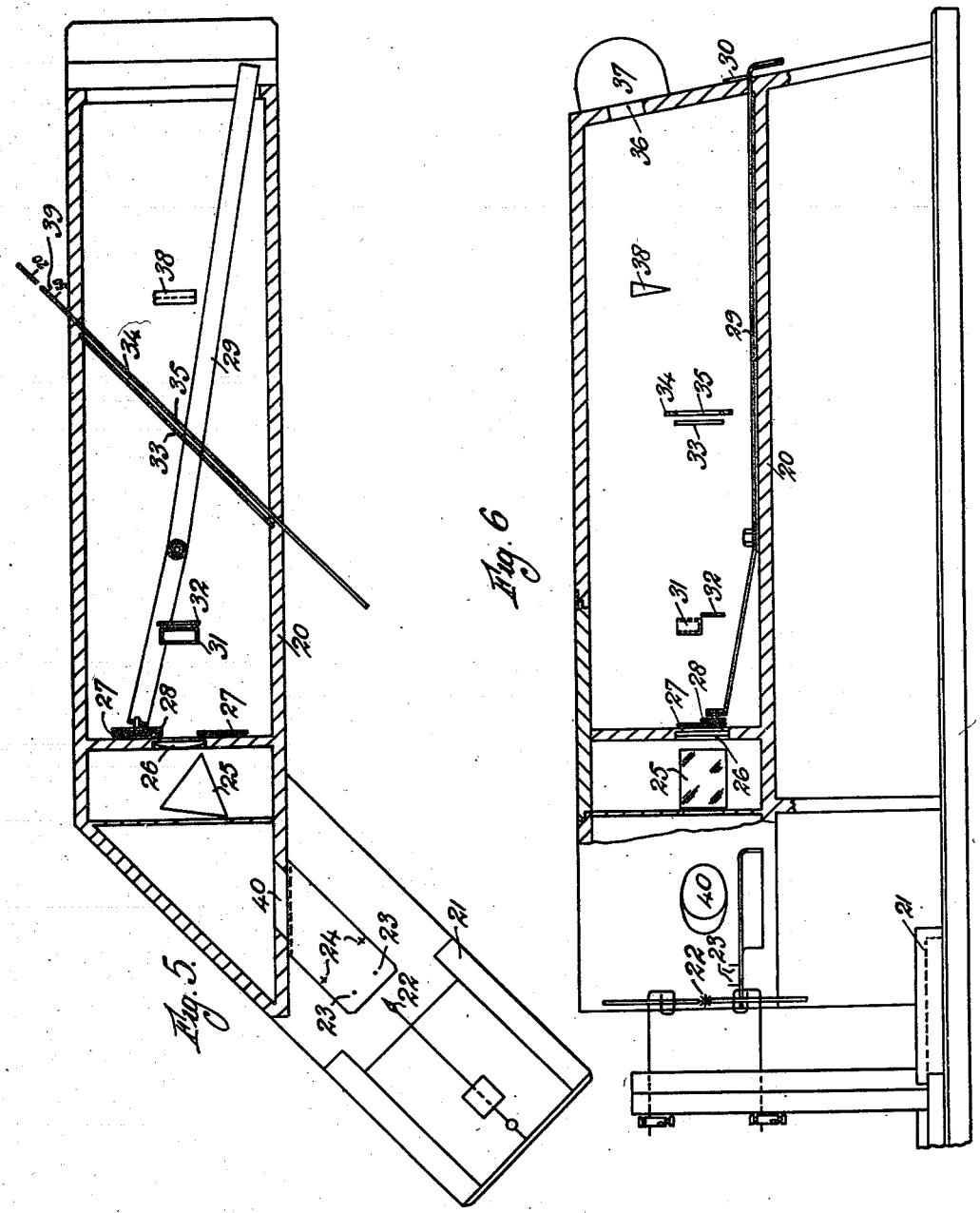

Patented Dec. 29, 1936

2,065,953

UNITED STATES PATENT OFFICE 2,065,953

APPARATUS FOR INVESTIGATING ABSORPTION SPECTRA OF SUBSTANCES

Frank Twyman and David Henry Follett, London, England, assignors to Adam Hilger Limited, London, England Application March 10, 1934, Serial No. 715,035
In Great Britain March 10, 1933

17 Claims. (Cl. 88—14)

The invention relates to improvements in apparatus for investigating absorption spectra of substances.

One object of the invention is to provide a convenient apparatus for the investigation of substances which absorb radiation, such for example as materials containing biologically active substances, such for example as cod liver and other fish oils, vitamin A concentrates and fruit juices.

It is known that liquids of this nature which contain vitamin A show a marked absorption band at 3280 A. U., and that estimation of the vitamin activity by measurement of the strength of this absorption band gives extremely good agreement with biological evaluations.

In some cases a small fraction of the absorption at 3280 A. U. is not due to vitamin A but to other constituents of the oils. In order therefore for the radiation absorption method to be used as a quantitative measure of vitamin A activity, a correction must be applied. For pure weakly coloured cod-liver oils it is generally satisfactory to subtract 0.2-0.3, whilst highly coloured oils of the cattle feeding variety require a somewhat larger correction.

It is further known that the substance responsible for the absorption band in question may be destroyed for example by subjecting the oil to the action of radiation of wave lengths near 3200 A. U., (such radiation being obtained by subjecting the specimen contained in a quartz test tube silvered on the outside, to the radiation of a quartz mercury lamp), or alternatively by "blowing" with oxygen. It is well known that a thin film of silver transmits radiation in this neighbourhood.

The problem of devising a simple and reliable physical test for the relative vitamin A values of various specimens of oils thus becomes the problem of determining the relative amounts present therein of the substances to which the 3280 band is due.

According to one feature of the invention, the vitamin A contents of substances are determined by apparatus comprising a source of radiation means for passing a beam of radiation from said source through a specimen of the substance under investigation, and means for comparing the radiation of a wave length in the neighbourhood of 3280 A. U. transmitted through the substance with radiation transmitted in a second beam from said source serving as standard.

In a preferred apparatus for the estimation of vitamin A contents a cylindrical quartz lens is used and the lens is lightly silvered, and a part of the beam corresponding to a part of the length of the lens is passed through the specimen, while the other part of the beam is passed through a compensating plate which compensates for the loss of radiation due to reflection and absorption by the walls of the specimen holder, and both parts of the beam are allowed to impinge on a fluorescent screen when two aligned line images will be formed. The intensities of these two images are equalized by adjustment of the amount of radiation transmitted in one of the beams. The specimen holder and compensating plate may be placed at either side of the lens.

This apparatus may be adapted according to a further feature of the invention for the estimation of other substances which absorb radiation by separating the lens and filter. Thus a quartz cylindrical lens is used, and for the measurement of vitamin A, a detachable filter such as a silvered quartz plate. This filter is made interchangeable with other filters which pass light of a wave length appropriate for each biologically active component or adulterant to be estimated.

Thus in addition to measuring vitamin A contents, the apparatus according to this feature of the invention may be used for measuring vitamin D contents of fish oils or vitamin C contents of fruit juices by the use of appropriate filters.

By way of example a few wave lengths at which biologically active substances and adulterants give selective absorption are given below:

|  | Angstrom units |
|---|---|
| Vitamin A | 3280 |
| Vitamin C | 2650 |
| Calciferol (vitamin D) | 2650 |
| Tea seed oil (used as an adulterant for olive oil) | 2720 |

Christiansen filters are suitable for use in apparatus according to the invention. These filters consist of powdered glass or quartz immersed in a liquid, which for a particular wave length and temperature have a refractive index exactly the same as that of the powdered glass or quartz. Such filters may be made suitable for passing light of different wave length ranges, and when carefully made are found to transmit only a narrow range of wave lengths.

Filters suitable for the invention may also be prepared from photographic lantern plates (see British Journal of Photography, vol. 80, page 495, 1933). By variation of the exposure and development, filters of different colours are obtainable, all showing a maximum transmission near 3000 A. U.

A further object of the invention is to provide a spectrophotometer which is particularly, though not exclusively suitable for investigations in the ultraviolet part of the spectrum.

A spectrophotometer according to this feature of the invention comprises a source of radiation, a cylindrical lens and a screen upon which a beam of radiation is focussed by said lens, means located in said beam between said source and screen for dispersing the radiation into a spectrum, a holder for interposing a specimen in part of said beam corresponding to a part of the length of the lens, and means for comparing at the same wave length the image intensities on the screen corresponding to the two parts of the beam.

The specimen of the substance under investigation may be located on either side of the means for dispersing the radiation into a spectrum, e. g. a prism, and the cylindrical lens may be placed before or after the prism.

In the above description the use of quartz lenses and filters has been suggested but in order to cheapen the production, any of the known glasses which transmit the ultraviolet such as vita glass or uviol glass, for example, may be used, though quartz is preferred.

The intensity of the radiation may be increased by enclosing the source of radiation in a reflecting chamber.

Two forms of apparatus according to the invention are illustrated in the accompanying diagrammatic drawings, in which:—

Figure 1 is a sectional side elevation of an apparatus for the investigation of biologically active substances.

Figures 2, 3, and 4 are detail views on an enlarged scale of lens-filter arrangements for use in the apparatus of Figure 1.

Figure 5 is a sectional plan of a spectrophotometer according to the invention, and Figure 6 is a sectional side elevation of the apparatus of Figure 5.

Referring to Figures 1-4, 1 is the base plate of the apparatus upon which is mounted an arc 2 with iron or copper poles. 3 indicates the lens filter system which will be more fully described later. 4 is an apertured plate, the lower half of the aperture being coverable by a movable shutter 5, connected to a hand lever 6 which passes beneath a scale 7. The width of the lower half of the aperture is thus adjusted by moving the lever 6. 8 is a container for a specimen of the substance under investigation, and 9 is a compensating plate to compensate for the loss of radiation in the upper part of the beam due to reflection and absorption by the walls of the container. 10 is a screen, which for observation in the ultraviolet is made of fluorescent glass such as uranium glass.

When the apparatus is intended for the estimation of vitamin A only, the lens filter system shown in Figure 2 is used. A is a plano-convex cylindrical lens which is silvered on its plane side, and the silvering is protected by a protective plate B. The lens is inserted in an aperture of the casing of the apparatus. It is found in practice that some leakage of radiation other than that of a wave length of 3280 A. U. may occur, and to obviate this a supplementary filter of Woods glass may be used. In the form illustrated the plate B is made of Woods glass (a glass containing nickel oxide which is opaque to visible radiation but transmits ultraviolet) and serves to protect the silver film and also serves as the supplementary filter. The lens A and plate B may be attached together by a balsam ring round their edges and in use the plate B is preferably located nearest the arc.

Where other substances, for example the other vitamins, are to be estimated, the form shown in Figure 3 may be employed. In this case the lens A is unsilvered, and a separate filter carrier D is inserted into the aperture of the casing, and is held in position by the screws T. The carrier D carries the filter C which is a silvered quartz plate, and a protective plate B, which, as in the previous case, may be of Woods glass. The filter carrier D is thus readily detachable and may be replaced by a carrier containing different filters.

If Christiansen filters are employed the mounting shown in Figure 4 is used, as the temperature of the filters needs accurate regulation.

Referring to Figure 4, A again is the cylindrical quartz lens. The body of the filter carrier D may be nickel plated so as to minimize the radiation or absorption by it of heat. It is held in position by the screws T. The carrier D has two quartz windows E and is filled with liquid which it will be understood, must transmit the radiation in question. Immersed in the liquid is the Christiansen filter F. The temperature of the liquid is maintained constant by a heating lamp G which is preferably blackened so that no visible or ultraviolet radiation leaves its surface, controlled through a relay (not shown) by a thermostat generally indicated at H.

Referring to Figure 1, the operation of the device is as follows:—Radiation from the arc 2 passes through the lens filter system 3, and the two halves of the aperture in the plate 4; and the upper part of the beam passes through the specimen container 8, while the lower part passes through the compensating plate 9. The radiation then impinges on the fluorescent screen 10, where two aligned line images are formed. These are observed through the opening 11, which is shielded by an eyeshade 12. The intensities of the two lines are equalized by adjustment of the lever 6, and when equality is reached a reading is made on the scale 7. When the apparatus is being used for a vitamin A determination a correction for an absorption at 3280 A. U. by substances other than vitamin A can be made by destroying the vitamin A (e. g. by blowing oxygen through the specimen) and taking a second reading; the difference between the two readings gives the vitamin A content of the specimen.

In order to render the images contiguous, a narrow angled prism 13 may if desired be inserted between the images and the eye of the observer, so that one line is observed through the prism while the other is observed directly.

Referring to Figures 5 and 6, the main casing of the spectrophotometer is indicated at 20. Upon the base of the casing an arc 22 is mounted in slides 21. The arc may be a carbon arc in this case and the apparatus may therefore be used with alternating current.

In front of the arc are situated two pegs 23 and two targets 24. The arc is moved until the shadow of each peg 23 falls upon its respective target 24, when the arc is correctly located with respect to the optical system. A beam of radiation passes through the passage 40, in front of which a prism 25 is placed and the radiation which is dispersed by the prism passes through a cylindrical quartz lens 26 and then passes through the aperture of a plate 27. The lower half of the aperture is coverable as in the apparatus of Figure 1 by a movable shutter 28 which is connected to a lever 29 passing beneath a scale 30. The upper part of the beam then passes through a specimen holder 31 and the lower part through a compensating plate 32 to a screen 33 upon which two aligned series of line images of the apertures are formed. The screen 33 is inclined, since the focal length of the lens varies with the wave length, and the angle of inclination is such that the whole spectrum is sharply focussed on the screen. The images formed on the screen are observed through the observation hole 36 which is shielded as before by an eyeshade 37. A sliding screen 34 having a narrow slit 35 is preferably interposed between the screen and the eye so that any desired region of the spectrum may be isolated. The slit 35 is preferably wedge shaped as shown so that when an observation is made the edges of the slit are not seen. The sliding screen is provided with a wave length scale indicated at 39. A narrow angled prism 38 may, as in the apparatus shown in Figure 1, be interposed between the eye and the image.

In operation the slide is first moved so as to isolate the desired part of the spectrum, and a specimen is placed in the holder 31. The line images are then equalized by adjustment of the lever 29.

It will be noted that in the apparatus shown, no provision is made for collimating the light since for some purposes sufficiently good definition can be obtained with the very simple arrangement described, and where the apparatus is required for use by comparatively unskilled persons this is a great advantage. Further, the cost of the apparatus is reduced.

If better definition is required a collimator may be used, and if still better definition is required a small hole can be used with the collimator in the usual way, the light from the light source being focussed on to the small hole. The use of this collimator with or without a small hole has no detrimental effect on the use of the cylindrical lens in the manner described.

In some instances it may be desirable to produce an extremely powerful line of light necessitating a large cylindrical lens and in such a case the aberrations of the cylindrical lens may be either corrected in a manner exactly analogous with the correction of compound lenses with spherical surfaces, or if it is not necessary for the cylindrical lens to be achromatic it may be corrected for aberration by figuring in the same way as in the case of spherical lenses.

It will be understood that the invention is not limited to direct visual observation upon a screen. Where it is desired to make electrical measurements the screen may be constituted by or may comprise two or more photoelectric cells, by which the image intensities in the two parts of the beam are compared.

When the visible region of the spectrum is under investigation the screen may be constituted by or may comprise an eye-piece of the usual kind, by which visual observations of the images are made.

What we claim is:—

1. Photometric apparatus for estimating substances which have a characteristic selective radiation absorption comprising in combination with a source of radiation, means for separating radiation of a wave length selected according to the nature of an absorption substance to be investigated, an observation screen, means disposed in the path of a beam of the radiation for focussing two parts of said beam to travel alongside each other throughout their lengths and to form directly on the observation screen a pair of closely adjacent images of the source of radiation, means for interposing a specimen to be investigated in the part of the beam corresponding to one image of the pair, and means for equalizing the two images by relative adjustment of the radiation intensities of the parts of the beam corresponding respectively to the said images.

2. Photometric apparatus as claimed in claim 1, in which the means for equalizing the two images comprises an adjustable shutter interposed in one part of the beam, and in which the specimen under investigation is interposed in the other part of the beam.

3. Photometric apparatus as claimed in claim 1, in which the means for focusing the beam of radiation into a pair of aligned images comprises a cylindrical lens.

4. Photometric apparatus as claimed in claim 1, in which a compensating plate is interposed in the part of the beam in which the specimen to be investigated is not interposed.

5. Photometric apparatus as claimed in claim 1, in which a narrow angle prism is provided between the screen and a place from which it is observed.

6. Photometric apparatus as claimed in claim 1, adapted for use with ultraviolet radiation, the observation screen being a fluorescent screen.

7. Photometric apparatus for estimating substances which have a characteristic selective ultraviolet radiation absorption comprising in combination with a source of radiation a filter for separating radiation of a wave length selected according to the nature of an absorption substance to be investigated, a fluorescent observation screen, means comprising a cylindrical lens disposed in the path of a beam of the radiation for focusing the beam to form directly on the observation screen a pair of closely adjacent aligned images, means for interposing a specimen to be investigated in the part of the beam corresponding to one image of the pair and means for equalizing the two images by relative adjustment of the radiation intensities of the parts of the beam corresponding respectively to the said images.

8. Photometric apparatus as claimed in claim 7, in which the filter is a film of silver deposited on a body which transmits radiation of a wave length absorbed by vitamin A.

9. Photometric apparatus as claimed in claim 7, in which the filter is made of silvered quartz.

10. Photometric apparatus as claimed in claim 7, adapted for investigating vitamin A contents of substances in which the cylindrical lens is made of silvered quartz, and constitutes a lens-filter unit.

11. Photometric apparatus as claimed in claim 7, in which the filter is made of silvered quartz and comprising a supplementary Woods glass filter.

12. Photometric apparatus as claimed in claim 7, in which the source of radiation is a copper arc and the filter is silvered quartz.

13. Photometric apparatus as claimed in claim 7 and comprising a casing open at one end to admit a beam of radiation from an external source, the cylindrical lens, filter and an image equalizing means being mounted adjacent said opening, and open at the other end for observing the screen which is inside the casing intermediate its ends.

14. Photometric apparatus as claimed in claim 1 employing means for dispersing the beam of radiation into a spectrum.

15. Photometric apparatus for estimating substances which have a characteristic selective radiation absorption comprising in combination with a source of radiation means for dispersing the radiation into a spectrum, an observation screen, means comprising a cylindrical lens disposed in the path of a beam of the dispersed radiation for focussing two parts of said beam to travel alongside each other throughout their lengths and to form directly on the observation screen a pair of closely adjacent aligned images of the source of radiation, means for interposing a specimen to be investigated in the part of the beam corresponding to one image of the pair, and means for equalizing the two images by relative adjustment of the radiation intensities of the parts of the beam corresponding respectively to the said images.

16. Photometric apparatus as claimed in claim 15, in which the observation screen is inclined across the focused beam of radiation and in which a device with a restricted aperture is movable along the screen to isolate selected images.

17. Photometric apparatus as claimed in claim 15, comprising a casing open at one end to admit a beam of radiation from the external source, the focusing means and a shutter being mounted adjacent said opening, and open at the other end for observing the observation screen which is inside the casing intermediate its ends, and in which the means for dispersing the radiation comprises a prism interposed between the first mentioned opening and the source of radiation.

FRANK TWYMAN.
DAVID HENRY FOLLETT.